L. A. HAWKINS.
AUTOMATIC SECTIONALIZING DEVICE.
APPLICATION FILED SEPT. 18, 1911.
1,023,377.
Patented Apr. 16, 1912.
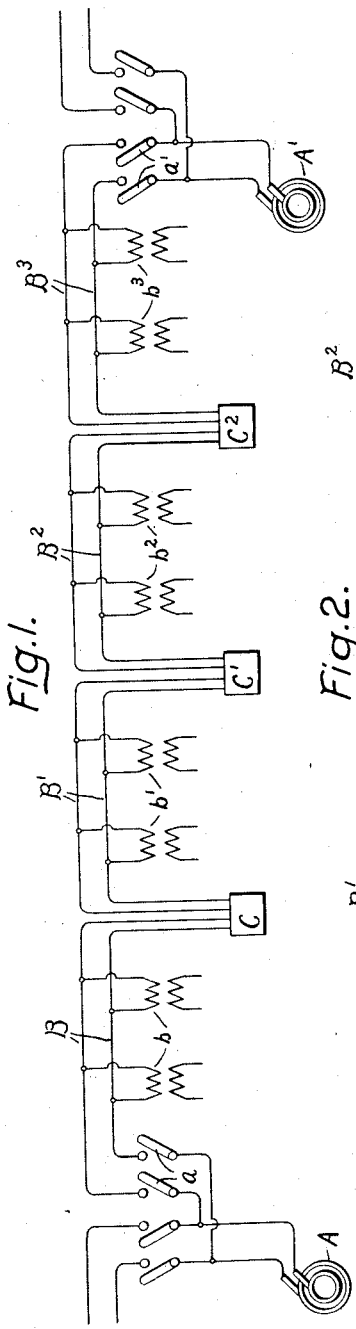
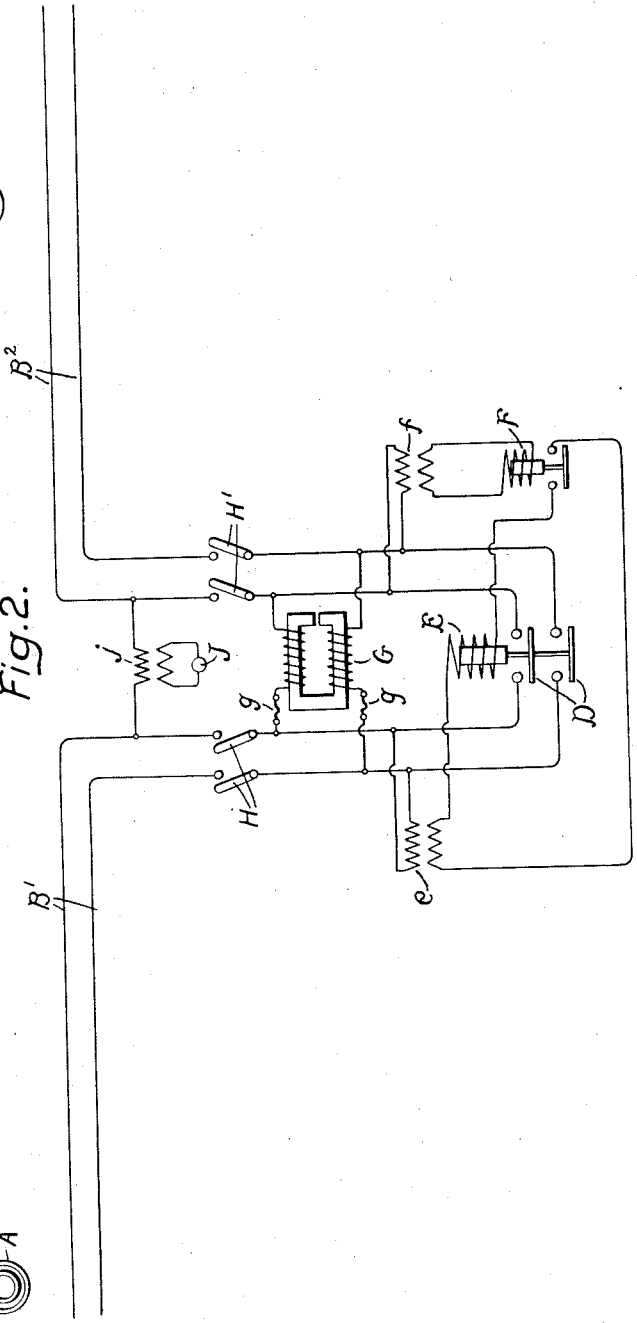
Witnesses:
Adolf Grimm
J. Ellis Glen
Inventor:
Laurence A. Hawkins,
by Albert G. Davis
His Attorney.

UNITED STATES PATENT OFFICE.

LAURENCE A. HAWKINS, OF SCHENECTADY, NEW YORK, ASSIGNOR TO GENERAL ELECTRIC COMPANY, A CORPORATION OF NEW YORK.

AUTOMATIC SECTIONALIZING DEVICE.

1,023,377.

Specification of Letters Patent. Patented Apr. 16, 1912.

Application filed September 18, 1911. Serial No. 649,977.

*To all whom it may concern:*

Be it known that I, LAURENCE A. HAWKINS, a citizen of the United States, residing at Schenectady, in the county of Schenectady, State of New York, have invented certain new and useful Improvements in Automatic Sectionalizing Devices, of which the following is a specification.

My invention relates to the operation of sectionalized transmission lines such as are often employed where the load is distributed along the line, and it is desired in case of a short circuit or other failure on any part of the line to cut out a section of the line at the point where the short circuit or failure occurred so that the rest of the line may be maintained in operation while the short circuit is being removed, or the line repaired. Such an arrangement is particularly advantageous where there are sources of power at opposite ends of the line, which can feed in opposite directions up to the faulty section, for in such a case the load may be carried on all the line except the faulty section.

In the operation of sectionalized transmission lines in the past the sectionalizing switches have been either manually operated, or if automatic at all, have operated simply as overload circuit breakers. If the switches are manually operated, which is ordinarily the case, the faulty section can be cut out only by sending a man out on to the line to locate the short circuit and to pull the sectionalizing switches at both ends of the faulty section. Until this is done the entire line between power stations is out of service. Even if overload circuit breakers are employed for sectionalizing switches it is highly probable that a severe short circuit will blow the breakers not only between the faulty section and the adjacent section but at a number of other sectionalizing points on the line. Consequently a large part of the line is out of service until a man has been sent out to locate the trouble and to close the proper switches for energizing all sections but the faulty section. The advantages of automatic circuit breakers for sectionalizing outfits are therefore small as compared with manually operated switches and have therefore been seldom used so far as I am aware. In any case, it is obvious that with the arrangements heretofore employed, a large part of the line may be thrown out of service for a considerable time pending the location of the trouble and the proper manual manipulation of the switches. Such an interruption of service is highly objectionable on many kinds of transmission lines and particularly on transmission lines for supplying current to railway signal systems, for during such an interruption the signals are all out of service and traffic is very seriously delayed over the portion of the road on which the transmission is interrupted.

The object of my invention is to provide a sectionalizing device for such transmission lines as I have discussed above which is entirely automatic in its action. Upon the occurrence of a short circuit on any part of the line that part is at once disconnected from the power station and if as will hereinafter be explained the sectionalizing switches at other points open on a severe short circuit, they will at once close again successively and automatically, so as to re-energize all sections up to the faulty one. The sectionalizing device is entirely reversible in its operation, that is, it works equally well with current coming from either direction so that if the intermediate section between the two stations is short circuited, current may be turned on to the line at either station or both stations, and all sections between the faulty section and both stations will be automatically energized, while the faulty section will be kept out of service as long as the short circuit is maintained. Thus, there is no interruption, or at most only a momentary interruption, of service on any section except that which is short circuited.

My invention will best be understood by reference to the accompanying drawing in which—

Figure 1 shows diagrammatically a sectionalized transmission line of the type to which my invention is applicable, and Fig. 2 shows diagrammatically an automatic sectionalizing device arranged in accordance with my invention.

In Fig. 1, A and A' represent generators or power stations at opposite ends of a transmission line. By means of switches $a$ and $a'$, either generator may be connected to the line or both may be connected thereto so as to operate in parallel. The transmission line is divided into sections B to B³ at a number of points C to C² between the power stations. The distributed load on each section is indicated by transformers $b$ to $b^3$. In case of a short circuit on any section as, for instance, section B², it is desirable that this section should be disconnected from its adjacent sections at points C' and C² but that the connection between sections B and B' should not be interrupted, or if momentarily interrupted, should at once be restored, so that generator A may maintain sections B and B' in operation while generator A' maintains section B³ in operation. At each of the points C to C² I provide an automatic sectionalizing device such as is shown diagrammatically in Fig. 2. Switch contacts D are provided for connecting directly together the sections B' and B². These contacts are actuated by a magnet winding E which is energized from a step-down transformer $e$ connected across the section B'. The circuit of winding E is controlled by a relay F which is energized from the secondary of a step-down transformer $f$, the primary of which is connected across the section B². These transformers $e$ and $f$ may be special transformers for supplying these windings only or they may be transformers carrying part of the distributed load of the system. G represents an impedance connected in shunt to the switch contacts D and consisting of a double reactive coil having two windings which may or may not be on the same magnetic core as indicated and which are connected in shunt to the two contacts D respectively. $g$, $g$ represent fuses in circuit with the windings of reactance G. H and H' represent manually operated emergency switches for disconnecting the apparatus from sections B' and B² respectively. J represents a synchronizing lamp or other synchronism indicator connected to the secondary of a transformer $j$, the primary of which is connected between like wires of sections B' and B².

Assuming first that the system is in operation with switches H and H' closed and contacts D also closed, the two sections B' and B² are then connected directly together. Winding E is energized by the voltage on section B' and winding F by the voltage of section B² and since these two sections are now connected directly together, there are now equal voltages on these two windings or at least on the primaries of the transformers supplying them. If the power is coming from the left, that is, from section B' to section B², and if a short circuit occurs on section B², it will be seen that both sections will momentarily lose their voltage and winding E will allow contacts D to open. This throws the impedance G into circuit between the two sections so that the short circuit on section B² is no longer felt on section B'. Consequently if the sectionalizing devices to the left of B' have not opened, the voltage is immediately restored to this section, the voltage between section B' and B² being used up in the drop in the reactive windings of impedance G. Voltage is thus restored to the primary of transformer $e$ but winding E cannot close contacts D because relay F is deënergized, since there is a short circuit on the primary $f$ which supplies this relay. The faulty section is thus cut out while the section to the left is left in operation. If the short circuit was sudden and severe so as to open the sectionalizing apparatus to the left of B' or even at the power house, such sectionalizing apparatus to the left of B' will close again as soon as the circuit breakers in the power house have been closed, if they were open, or as soon as the contacts between B' and B² open, if the circuit breakers at the power house were not tripped. If the load between stations A and A' was being carried before the short circuit by station A alone, then as soon as the short circuit has occurred and the faulty section B² has been disconnected at C', and also at C², since the magnet winding E and C² was of course without voltage, station A can call up station A' and instruct the latter station to close the switches $a'$ so as to energize section B³. The sectionalizing contacts at C² will not close for although relay F at point C² is energized, winding E is not energized, because the primary of the transformer supplying it is short circuited. If the short circuit occurred on the section B' instead of section B² then when switches $a'$ are closed at station A' the contacts D at C² will close so as to connect B² to section B³, and therefore to generator A', but the switch contacts at C' will remain open because of the short circuit on B'. If both stations were operating in parallel at the time of the short circuit on any section, as for instance, B², the faulty section will be disconnected at both ends and the remaining sections left in operation, or if any of these sections were momentarily open circuited, the circuit will immediately be restored as soon as the switch contacts at C' and C² have opened. Thus, in any case, whether the line is being fed from one end or the other, or from both, the faulty section is cut out at both ends and the remaining sections, if momentarily thrown out of service, are immediately restored to service simply by closing the circuit breakers or switches $a$ and $a'$ at opposite ends of the line.

While the limited current which is passed through the impedance from one section to an adjacent short circuiting section is not sufficient to interfere with the operation of the adjacent sections, it of course would be dangerous for a man to work on the short circuited section, because if the short circuit is not of zero resistance there is still some voltage between the lines, and also because as soon as the short circuit is removed full voltage will be restored to the line by the automatic closing of the sectionalizing devices at the ends of the section. Therefore before working on the faulty section, as for instance B², the disconnecting switches H' should be opened at one end of the section and the switches corresponding to H at the other end of the section. After the line has been repaired or the short circuit removed the faulty section may be cut into service without interrupting even momentarily the operation of the rest of the line, if synchronizing means are provided at the sectionalizing apparatus so that the two stations A and A' will not be connected when they are out of synchronism. This is the purpose of the synchronizing lamp or other device J. Suppose, for instance, that section B² has been short circuited and disconnected at both ends while the sections on each side of it are kept in operation from the two stations at opposite ends of the line. After the short circuit has been removed the disconnecting switches may be closed at once at one end of the line, say for instance, at the right end, whereupon the automatic devices will immediately close so that section B² will be supplied from generator A'. Next, right hand switch H' may be closed so as to connect one wire of section B² with one wire of section B'. If the two stations are out of synchronism, this will then be indicated by the lamp or other device J but when the stations have been brought into synchronism by telephonic or other communication, this too will be indicated by the lamp J and at the proper instant, which, with the connections shown, will be when the lamp J is dark, the left hand switch H' may be closed, thus throwing the stations into parallel through the reactance G, and this reactance will immediately be short circuited by the automatic closing of switch contacts D.

The apparatus above described will take care not only of a direct short circuit between the conductors of a single section but also of a short circuit caused by a ground on one wire of one section and a second ground on the other wire of another section. For instance, suppose the upper wire of section B' and the lower wire of section B² be grounded. If all the switches are closed this makes a short circuit on the line. Suppose first that the power is coming from generator A. The automatic switches at C' will open, and perhaps also those at C will open momentarily. The latter switches will however close and a circuit will then be established from section B through the lower wire of section B', the lower winding of reactance G at C' to the lower wire of section B², thence through the double ground to the upper wire of section B' and thence to the upper wire of section B. Thus the full line voltage is thrown on to one winding of reactance G. If this winding is designed to carry the full line voltage, instead of being designed for only the half voltage which it ordinarily carries upon a short circuit on a single section, no further result will follow, and the section B' will continue in operation, the load thereon being shunted by one winding of reactance G at C'. If, however, as would ordinarily be the case, the full voltage on one winding of reactance G would cause that winding to draw an excessive current, the only result would be to blow the lower fuse $g$, as shown in Fig. 2. In either case, section B' would be left in operation from station A. Then if station A' closes the switches $a$, section B³ will be at once energized and section B² also because of the closing of the automatic switches at C². The voltage from station A' will then be thrown across the other winding of reactance G and either this winding will act as a shunt on section B² or else the other fuse $g$ will blow. In either case all the sections are left in operation, with at most a momentary interruption and the blowing of a couple of fuses. The same result occurs if the two grounds occur on sections which are not adjacent, as for instance, B and B². In this case if the power is coming from station A the automatic switches at point C will at once close again if they open momentarily, and this connects sections B and B' together so that a ground on one wire of section B then becomes the same as a ground on the same wire of section B' so that the conditions are then precisely the same as though the grounds were on adjacent sections, which is a condition that has already been discussed.

The size of the impedance G has been mentioned in connection with the discussion of double grounds on adjacent sections. Another consideration which enters into the proportioning of this impedance is the amount of load on each section and the voltage required to operate the relay F or the switch-operating winding E. For instance, during a short circuit on one section, for instance, B², the reactance G must carry in its two windings in series a voltage drop equal to the voltage on B'. When there is no short circuit on B² there is nevertheless a circuit between the two wires of the section having a certain impedance depending on the load on that section, so that when section B² is in normal condition and the voltage is thrown on to section B' the voltage drop before contacts D close is partly in impedance G and partly in the load on section B². The greater the amount of impedance G the lower is the voltage for operating relay F, so that impedance G should be designed relative to the load on section $B^2$ so that under normal conditions an appreciable fraction of the drop will occur in the devices connected across sections $B^2$ so as to energize relay F. This means that the impedance of the device G should not be too great, if the automatic devices are to close properly under normal conditions. On the other hand, this impedance should not be too small for otherwise too large a current would be drawn by the reactance when there is a short circuit on section $B^2$. The best proportion between the impedance of the devices G and that of the load connected to each adjacent section is determined in each case by the conditions of operation.

I do not desire to limit myself to the particular construction and arrangement of parts shown and described but aim in the appended claims to cover all modifications which are within the scope of my invention.

What I claim as new and desire to secure by Letters Patent of the United States is:—

1. In combination, a sectionalized transmission line, switch contacts for connecting adjacent sections directly together, means for passing a limited current from one section to the second while said switch contacts are open, a winding energized from said limited current in said second section under normal conditions of said second section, and means controlled by said magnet winding for closing said switch contacts.

2. In combination, a sectionalized transmission line, switch contacts for connecting adjacent sections directly together, an impedance in shunt to said switch contacts, and two windings, energized by the voltages on the two sections respectively, jointly controlling said switch contacts.

3. In combination, a sectionalized transmission line, switch contacts for connecting adjacent sections directly together, an impedance in shunt to said switch contacts, and two windings, energized by the voltages on the two sections respectively, jointly controlling said switch contacts, and manually operated switches for disconnecting all the above-mentioned apparatus from the line.

4. In combination, a sectionalized transmission line, switch contacts for connecting adjacent sections directly together, an impedance in shunt to said switch contacts, step-down transformers having their primaries connected across adjacent sections of the line, two windings energized from the secondaries of transformers connected to adjacent sections, and means controlled by both windings for controlling the switch contacts for connecting said adjacent sections together.

5. In combination, a sectionalized transmission line, switch contacts for connecting adjacent sections directly together, an impedance in shunt to said switch contacts, step-down transformers having their primaries connected across adjacent sections of the line, an actuating winding for said switch contacts energized from the secondary of a transformer connected to one section, and a relay controlling the circuit of said winding energized from a transformer connected to the adjacent section.

6. In combination, a sectionalized transmission line, switch contacts for connecting adjacent sections directly together, an impedance in shunt to said switch contacts, an actuating winding for said switch contacts energized by the voltage on one section, and a relay controlling the circuit of said winding energized by the voltage on the adjacent section.

In witness whereof, I have hereunto set my hand this 16th day of September, 1911.

LAURENCE A. HAWKINS.

Witnesses:
HELEN ORFORD,
GEO. G. WHITTLESEY.